US010639572B2

(12) United States Patent
Tuma et al.

(10) Patent No.: US 10,639,572 B2
(45) Date of Patent: May 5, 2020

(54) STYRENE-ACRYLONITRILE FINE FIBERS, FILTER MEDIA, RECIRCULATION FILTERS, AND METHODS (71) Applicant: DONALDSON COMPANY, INC., Minneapolis, MN (US)

(72) Inventors: Daniel L. Tuma, St. Paul, MN (US); Dmitry Luzhansky, Eden Prairie, MN (US); Stanley B. Miller, III, Eden Prairie, MN (US); Peter Viktorovich Medvedev, Sillamae (EE)

(73) Assignee: Donaldson Company, Inc., Minneapolis, MN (US)

( * ) Notice: Subject to any disclaimer, the term of this patent is extended or adjusted under 35 U.S.C. 154(b) by 383 days.

(21) Appl. No.: 15/399,838

(22) Filed: Jan. 6, 2017

(65) Prior Publication Data
US 2017/0197163 A1     Jul. 13, 2017

Related U.S. Application Data (60) Provisional application No. 62/276,005, filed on Jan. 7, 2016.

(51) Int. Cl.
    *B01D 39/16*      (2006.01)
    *B01D 46/00*      (2006.01)
    *D01D 5/00*      (2006.01)

(52) U.S. Cl.
CPC ..... *B01D 39/1623* (2013.01); *B01D 46/0036* (2013.01); *B01D 2239/025* (2013.01); *B01D 2239/0407* (2013.01); *B01D 2239/0631* (2013.01); *B01D 2239/0654* (2013.01); *B01D 2239/10* (2013.01); *B01D 2239/1225* (2013.01); *B01D 2239/1258* (2013.01); *B01D 2239/1291* (2013.01); *B01D 2275/10* (2013.01); *B01D 2279/45* (2013.01); *D01D 5/003* (2013.01); *D10B 2321/10* (2013.01); *D10B 2321/121* (2013.01); *D10B 2505/04* (2013.01)

(58) Field of Classification Search
CPC ............ B01D 39/1623; B01D 46/0036; B01D 2239/025; B01D 2239/0407; B01D 2239/0631; B01D 2239/0654; B01D 2239/10; B01D 2239/1225; B01D 2239/1233; B01D 2239/1258; B01D 2239/1291; B01D 2275/10; B01D 2239/2239; D01D 5/003
See application file for complete search history.

(56) References Cited

U.S. PATENT DOCUMENTS

| 4,650,506 | A | * | 3/1987 | Barris | ................ | B01D 39/1623 |
| | | | | | | 210/505 |
| 5,538,545 | A | | 7/1996 | Dauber et al. | | |
| 5,876,487 | A | | 3/1999 | Dahlgren et al. | | |
| 5,997,618 | A | | 12/1999 | Schneider et al. | | |
| 6,077,335 | A | | 6/2000 | Schneider et al. | | |
| 6,146,446 | A | | 11/2000 | Tuma et al. | | |
| 6,168,651 | B1 | | 1/2001 | Tuma et al. | | |
| 6,743,464 | B1 | | 6/2004 | Insley et al. | | |
| 6,877,311 | B2 | | 3/2005 | Koslow | | |
| 7,789,930 | B2 | | 9/2010 | Ensor et al. | | |
| 7,981,509 | B2 | | 7/2011 | Kalayci | | |
| 8,177,876 | B2 | | 5/2012 | Kalayci et al. | | |
| 8,885,291 | B2 | | 11/2014 | Miller et al. | | |
| 9,153,291 | B2 | | 10/2015 | Miller, III et al. | | |
| 10,293,293 | B2 | | 5/2019 | Callahan et al. | | |
| 2006/0054023 | A1 | * | 3/2006 | Raetz | ................. | B01D 39/1623 |
| | | | | | | 96/134 |
| 2008/0110342 | A1 | * | 5/2008 | Ensor | ................. | B01D 39/1623 |
| | | | | | | 96/54 |
| 2010/0178585 | A1 | * | 7/2010 | Kuroda | ............... | H01M 4/8605 |
| | | | | | | 429/483 |
| 2011/0174158 | A1 | | 7/2011 | Walls et al. | | |
| 2014/0287230 | A1 | * | 9/2014 | Walls | ..................... | B01D 39/08 |
| | | | | | | 428/338 |
| 2015/0082985 | A1 | | 3/2015 | Miller, III et al. | | |
| 2015/0251116 | A1 | * | 9/2015 | Baer | ................... | B01D 39/1623 |
| | | | | | | 210/488 |
| 2017/0036151 | A1 | | 2/2017 | Callahan et al. | | |
| 2018/0085693 | A1 | | 3/2018 | Nicklay et al. | | |

FOREIGN PATENT DOCUMENTS

| DE | 10137161 A1 | 2/2003 | |
| EP | 0829293 A1 * | 3/1998 | ............. B01D 39/16 |
| EP | 1019174 B1 | 6/2005 | |
| WO | WO 2009/140385 A1 | 11/2009 | |
| WO | WO 2013/071065 A1 | 5/2013 | |
| WO | WO 2014/089458 A1 | 6/2014 | |
| WO | WO 2004/069378 A2 | 8/2014 | |
| WO | WO 2015/123406 A1 | 8/2015 | |

(Continued)

OTHER PUBLICATIONS

International Patent Application No. PCT/US2017/012421, filed Jan. 6, 2017; International Search Report /Written Opinion dated Mar. 31, 2017; 13 pages.
Idema Standards Ballot, "Particulate Cleanup Test Methods for Hard Disk Drives", Nov. 16, 2017, Reference Document, Microcontamination, Doc. 149, 1-10.
"Air Filtration with Electrospun Nanofihers", ElectrospinTech, Published online Apr. 1, 2014, last updated Nov. 7, 2017. Obtained from the Internet on Oct. 19, 2019, 5 pages. Available online at <http:// electrospintech.com/airfilter.html#.Xatu3vU3m72>.
Carey, "Stanford engineers develop new air filter that could help Beijing residents breathe easily", Feb. 18, 2015, *Stanford Report*, Stanford University, Stanford, California, 3 pages. Obtained from the Internet on Oct. 15, 2019. Available online at <https://news. stanford.edu/news/2015/february/filter-air-pollution-021815.html>.
Liu et al., "Transparent air filter for high-efficiency $PM_{2.5}$ capture," Feb. 16, 2015, *Nature Communications*, 6:6205 (9 pages).

(Continued)

*Primary Examiner* — Jason M Greene
(74) *Attorney, Agent, or Firm* — Mueting, Raasch & Gebhardt, P.A.

(57) ABSTRACT

The present disclosure provides styrene/acrylonitrile fine fibers, filter media including styrene/acrylonitrile fine fibers, a recirculation filter including a styrene/acrylonitrile fine fiber or filter media, and methods.

18 Claims, 5 Drawing Sheets

(56) References Cited

FOREIGN PATENT DOCUMENTS

| | | |
|---|---|---|
| WO | WO 2015/185068 A1 | 12/2015 |
| WO | WO 2016/164454 A1 | 10/2016 |
| WO | WO 2018/152683 A1 | 8/2018 |

OTHER PUBLICATIONS

Matulevicius, et al., "Design and Characterization of Electrospun Polyamide Nanofiber Media for Air Filtration Applications," *Journal of Nanomaterials*, 2014, vol. 2014, Article ID 859656 (13 pages).

Wang, et al., "Figure of Merit of Composite Filters with Micrometer and Nanometer Fibers," *Aerosol Science and Technology*, 2008, 42:722-728.

Wang, et al., "Investigation of the figure of merit for filters with a single nanofiber layer on a substrate," *Journal of Aerosol Science*, 2008, 39:323-334.

\* cited by examiner

| 220 |
|---|
| 200 |
| 240 |
| 140 |
| 100 |
| 120 |

Figure 10

| 220 |
|---|
| 200 |
| 240 |
| 160 |
| 140 |
| 100 |
| 120 |

Figure 11

STYRENE-ACRYLONITRILE FINE FIBERS, FILTER MEDIA, RECIRCULATION FILTERS, AND METHODS

CONTINUING APPLICATION DATA

This application claims the benefit of U.S. Provisional Application No. 62/276,005, filed Jan. 7, 2016, the disclosure of which is incorporated by reference herein in its entirety.

BACKGROUND OF THE DISCLOSURE

Contaminants within an electronic enclosure, such as a hard disk drive enclosure, can reduce the efficiency and longevity of the components within the enclosure. Contaminants including chemicals and particulates can enter the hard drive enclosure from external sources or be generated within the enclosure during manufacture or use. The contaminants can gradually damage the drive, resulting in deterioration of drive performance and even complete failure of the drive.

Consequently, data storage systems such as hard disk drives typically include one or more filters capable of removing or preventing entry of particulate and/or chemical contaminants in the air within the disk drive enclosure. One type of such filter is a recirculation filter, which is generally placed such that it can filter out contaminants from the path of airflow caused by rotation of one or more disks within the disk drive.

SUMMARY

The present disclosure provides a fine fiber material that includes a styrene/acrylonitrile (SAN) copolymer, a filter media that includes the fine fiber material, and filter structures including, for example, a recirculation filter, that include the fine fiber material or the filter media. The present disclosure further provides methods of making and using the fine fiber material, filter media that includes the fine fiber material, and filter structures including, for example, a recirculation filter, that include the fine fiber material or the filter media.

In one embodiment, there is provided a filter media that includes: a fine fiber material comprising a styrene/acrylonitrile (SAN) copolymer; and a substrate material. The fine fiber material is disposed on the substrate.

In certain embodiments, the basis weight of the fine fiber material is 5 grams per square meter ($g/m^2$) to 20 $g/m^2$, the permeability of the fine fiber material and the substrate material is 100 feet per minute (ft/min) (50.8 centimeters per second (cm/sec)) to 1000 ft/min (508 cm/sec) at 0.5 inches of water (125 pascal (Pa)), and/or the efficiency of the fine fiber material and the substrate material is at 45 percent (%) to 99.99% for 0.3 micrometer ($\mu m$) Di-Ethyl-Hexyl-Sebacat (DEHS) particles at 10.5 ft/min (5.3 cm/sec).

In certain embodiments, the fine fiber material forms a layer having a thickness. In certain embodiments, the thickness of the layer of the fine fiber material is less than 1.0 millimeter (mm). In certain embodiments, the substrate material is a woven material or is a nonwoven material. In certain embodiments, the substrate material includes a polyester material.

In certain embodiments, the substrate material has a basis weight of 45 $g/m^2$ to 85 $g/m^2$, a thickness of 0.10 mm to 0.15 mm, and a permeability of 550 ft/min to 750 ft/min (279 cm/sec to 381 cm/sec) at 0.5 inches of water (125 Pa).

In certain embodiments, the substrate material is a first substrate material, and the fine fiber material is disposed between the first substrate material and a second substrate material.

In certain embodiments, the fine fiber material is disposed between the substrate material and a protective layer. In certain embodiments, the protective layer includes a polyethylene extruded mesh, a polyethylene nonwoven, and/or a polyester nonwoven. In certain embodiments, the protective layer has a permeability greater than the permeability of the substrate material. In certain embodiments, protective layer has a permeability greater than 1000 ft/min (508 cm/sec) at 0.5 inches of water (125 Pa).

In certain embodiments, the fine fiber material is a first fine fiber material and the substrate material is a first substrate material, and the filter media further includes a second fine fiber material comprising a styrene/acrylonitrile (SAN) copolymer and a second substrate material. In certain embodiments, the first fine fiber material and the second fine fiber material are disposed between the first substrate material and the second substrate material. In certain embodiments, the first substrate material and the second substrate material comprise the same material.

In certain embodiments, the filter media further includes a layer including an adsorbent media. In certain embodiments, the layer including an adsorbent media includes activated carbon. In certain embodiments, the layer including an adsorbent media is disposed between the first fine fiber material and a second fine fiber material, and the first fine fiber material and the second fine fiber material are disposed between the first substrate material and the second substrate material. In certain embodiments, the layer including an adsorbent media includes beads including activated carbon.

In certain embodiments, the styrene/acrylonitrile (SAN) copolymer includes 75% styrene and 25% acrylonitrile. In certain embodiments, the styrene/acrylonitrile (SAN) copolymer includes 10% to 90% styrene and 10% to 90% acrylonitrile.

In certain embodiments, the filter media includes less than 5 wt % of a stabilizer or an antioxidant. In certain embodiments, the filter media does not include a stabilizer or an antioxidant.

In another embodiment of the present disclosure there is provided a filter element that includes a filter media that includes a fine fiber material and a substrate material, as described herein.

In another embodiment of the present disclosure there is provided a recirculation filter that includes a filter media that includes a fine fiber material and a substrate material, as described herein. In certain embodiments, the recirculation filter is adapted for use in an electronic enclosure.

In another embodiment of the present disclosure there are provided methods of using the recirculation filters, as described herein.

In another embodiment of the present disclosure there is provided a method of making fine fibers, the method including: providing a solution including styrene/acrylonitrile (SAN) copolymer and an organic solvent and electrospinning the solution onto a substrate material. In certain embodiments, the distance between an emitter and the substrate material is at least 40 centimeters (cm). In certain embodiments, the organic solvent comprises dichloroethane.

Herein, a "fine" fiber has an average fiber diameter of less than 12.5 $\mu m$. Typically, this means that a sample of a plurality of fibers of the present disclosure has an average fiber diameter of less than 12.5 $\mu m$. In certain embodiments, such fibers have an average diameter of up to 11 µm, up to 10 µm, up to 6 µm, up to 5 µm, up to 2 µm, up to 1 µm, up to 0.8 µm, or up to 0.5 µm. In certain embodiments, such fibers have an average diameter of at least 0.05 µm, or at least 0.1 µm. In certain embodiments, such fibers have a linear density below 1 denier.

The term "polymer" includes, but is not limited to, organic homopolymers, copolymers, such as for example, block, graft, random and alternating copolymers, and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "copolymer" includes, but is not limited to, a polymer derived from two or more monomers, including terpolymers, tetrapolymers, etc.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present disclosure provides a fine fiber material that includes a styrene/acrylonitrile (SAN) copolymer, a filter media that includes the fine fiber material, and filter structures including, for example, a recirculation filter, that include the fine fiber material or the filter media. The present disclosure further provides methods of making and using the fine fiber material, filter media that includes the fine fiber material, and filter structures including, for example, a recirculation filter, that include the fine fiber material or the filter media.

Although existing recirculation filters can remove contaminants, some recirculation filters incorporate materials that include individual fibers that can protrude from the filter material layer, extending beyond the outer layers of the filter element and further into the electronics enclosure. These extensions can cause damage to the disk drive including, for example, scratches to the drive surface. In addition, some existing recirculation filters incorporate polypropylene, which can result in the formation of particulate contaminants, or stabilizers which are used during heat extrusion of plastics included in the filter but can result in the formation of vapor contaminants.

The present disclosure provides improved recirculation filters for use in electronic enclosures that limit or curtail incursion of filter material beyond the filter material and into the electronics enclosure, eliminate the need to include stabilizers, and eliminate polypropylene.

Filter Media and Recirculation Filters

The present disclosure describes filter media that include a fine fiber material that includes a styrene/acrylonitrile (SAN) copolymer and a substrate material. The fine fiber material and/or filter media may be included in a filter structure such as, in some embodiments, a recirculation filter. Examples of such recirculation filters are described in U.S. Pat. Nos. 5,997,618; 8,885,291; and 9,153,291.

Figure 2:
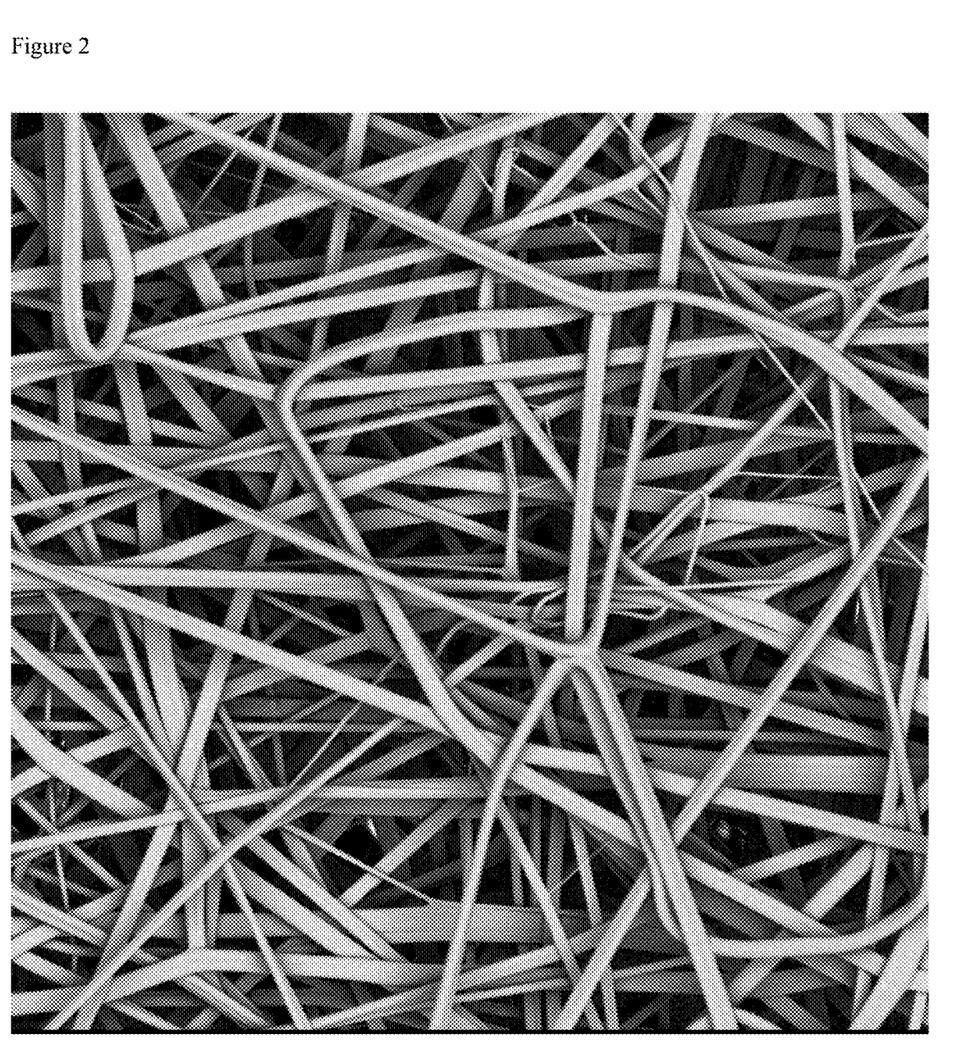
FIG. 2 shows 1000× magnification image obtained with a scanning electron microscope of one embodiment of the fine fiber material described herein.

Preferably, the fine fiber material is in the form of a layer comprising long monofilament fibers that have not been carded. Such a structure helps prevent the protrusion of the fiber or fibers from the fine fiber layer such as the protrusion observed from layers including shorter fibers which have been carded to form a fiber layer. In embodiments where the filter media is included in a recirculation filter, the long monofilament structure may help prevent the incursion of fine fiber material beyond the filter structure and into an electronics enclosure. An image of one embodiment of the fine fiber material described herein showing the monofilament structure can be seen in FIG. 2.

In the filter media described herein, the fine fiber materials are disposed on (typically, they are formed on and adhered to) a substrate material (i.e., filter substrate, filtration substrate, or a scrim). Natural fiber substrates and synthetic fiber substrates can be used as the substrate material. Examples include spunbonded or melt-blown supports or fabrics, woven and nonwoven materials of synthetic fibers, cellulosic materials, and glass fibers. Plastic screen-like materials, including extruded, embossed, expanded and/or hole punched, are other examples of substrate materials, as are ultra-filtration (UF) and micro-filtration (MF) membranes of organic polymers. Examples of synthetic woven materials include polyester woven, polyethylene woven, and nylon woven fabrics. Examples of synthetic nonwovens include polyester nonwovens, nylon nonwovens, acrylic nonwovens, polyolefin (e.g., polypropylene or polyethylene) nonwovens, or blended nonwovens thereof. Sheet-like substrates (e.g., cellulosic and/or synthetic nonwoven webs) are the typical form of the substrate material. The shape and structure of the substrate material, filter media, and/or the filter structure, however, is typically selected by the design engineer and depends on the particular filtration application.

A filter media according to the present disclosure includes a substrate material, wherein the fine fiber material is disposed on the substrate material. A substrate material may have a surface, and a the fine fiber material may preferably be disposed on the surface of the substrate material, as shown in one embodiment in FIG. 3A. In a preferred embodiment, the substrate material is a scrim.

In some embodiments, the basis weight of the fine fiber material in the filter media is 5 g/m$^2$ to 20 g/m$^2$, 5 g/m$^2$ to 12.5 g/m$^2$, 9 g/m$^2$ to 20 g/m$^2$, or 5 g/m$^2$ to 12.5 g/m$^2$. In some embodiments, the basis weight of the fine fiber material in the filter media is at least 5 g/m$^2$ or at least 9 g/m$^2$. In some embodiments, the fine fiber material the basis weight of the fine fiber material in the filter media is up to 12.5 g/m$^2$, up to 15 g/m$^2$, up to 18 g/m$^2$, or up to 20 g/m$^2$.

In some embodiments, the permeability of the fine fiber material and the substrate material in the filter media is 100 ft/min (50.8 cm/sec) to 1000 ft/min (508 cm/sec) at 0.5 inches of water (125 Pa), preferably 140 ft/min (71.1 cm/sec) to 400 ft/min (203 cm/sec) at 0.5 inches of water (125 Pa), more preferably 140 ft/min (71.1 cm/sec) to 250 ft/min (127 cm/sec) at 0.5 inches of water (125 Pa), or 140 ft/min (71.1 cm/sec) to 200 ft/min (102 cm/sec) at 0.5 inches of water (125 Pa). In some embodiments, the permeability of the fine fiber material and the substrate material in the filter media is at least 100 ft/min or at least 140 ft/min. In some embodiments, the permeability of the fine fiber material and the substrate material in the filter media is up to 200 ft/min, up to 250 ft/min, up to 400 ft/min, or up to 1000 ft/min.

In some embodiments, the efficiency of the fine fiber material and the substrate material in the filter media is 45% to 99.99%, preferably 45% to 96% for 0.3 μm particles at 10.5 ft/min (5.3 cm/sec). In a preferred embodiment, the particles are 0.3 μm Di-Ethyl-Hexyl-Sebacat (DEHS) particles. In some embodiments, the efficiency of the fine fiber material and the substrate material in the filter media is at least 45%. In some embodiments, the efficiency of the fine fiber material and the substrate material in the filter media is up to 96%, up to 99%, or up to 99.99%.

Figure 3A:
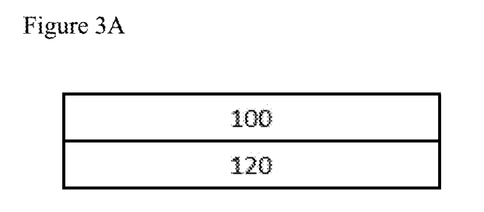
FIG. 3A shows a schematic representation of one embodiment of a filter media.
Figure 3B:
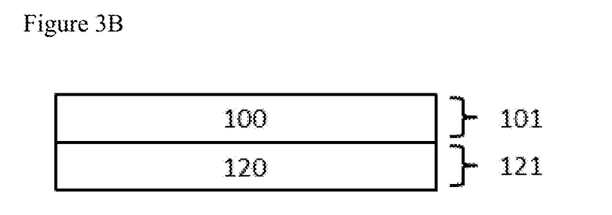
FIG. 3B shows a schematic representation of one embodiment of a filter media, wherein the fine fiber material forms a layer and the substrate material forms a layer.

In a preferred embodiment, the fine fiber material forms a layer, disposed on a substrate material, as shown in one embodiment in FIG. 3B. The thickness of the layer of fine fiber material may be up to up to 0.15 mm, up to 0.3 mm, up to 0.6 mm, or up to 1.0 mm. In some embodiments, the thickness of the fine fiber material can be at least 0.05 mm. In some embodiments, the thickness of the fine fiber material can be 0.05 mm to 0.15 mm.

In some embodiments, the thickness of a layer of the fine fiber material and the substrate material in the filter media is 2.5 mm+/−0.5 mm, more preferably 2.5 mm+/−0.2 mm.

Preferably, the substrate material includes fibers having an average diameter of at least 10 μm, more preferably at least 30 μm, and even more preferably at least 40 μm. In some embodiments, the fibers preferably have an average diameter of up to 55 μm. In some embodiments, the fibers preferably have an average diameter 50 μm±5 μm.

Also, preferably, the substrate material comprises a media having a basis weight of no greater than 260 grams per square meter (g/m$^2$), and more preferably no greater than 150 g/m$^2$. Preferably, the substrate comprises a media having a basis weight of at least 0.5 g/m$^2$, at least 2 g/m$^2$, or at least 5 g/m$^2$, or, more preferably, at least 8 g/m$^2$. In some embodiments, the basis weight of the substrate may be up to 75 g/m$^2$, up to 80 g/m$^2$, up to 90 g/m$^2$, or up to 95 g/m$^2$. In some embodiments, the basis weight of the substrate may be 40 g/m$^2$ to 95 g/m$^2$, 50 g/m$^2$ to 85 g/m$^2$, 50 g/m$^2$ to 80 g/m$^2$, and, in some embodiments, 58 g/m$^2$ to 75 g/m$^2$.

Preferably, the substrate material forms a layer, and the layer of the substrate material is at least 0.10 mm thick, and more preferably at least 0.12 mm thick. In some embodiments, the layer of substrate material may be at least 0.1 mm thick, 0.12 mm thick, 0.15 mm thick, or 0.17 mm thick. Preferably, the layer of the substrate material is no greater than 0.3 mm thick. In some embodiments, the layer of substrate material may be up to 0.2 mm thick, 0.25 mm thick, 0.3 mm thick, or 0.4 mm thick. Typically and preferably, the layer of the substrate material is 0.10 mm to 0.15 mm thick. In some embodiments, the substrate material, if evaluated separately from a remainder of the filter media, preferably has a Frazier permeability (differential pressure set at 0.5 inch of water) of at least 550 ft/min (279 cm/sec). In some embodiments, the substrate material preferably has a Frazier permeability (differential pressure set at 0.5 inch of water) of no greater than 750 ft/min (381 cm/sec). In some embodiments, the substrate material has a Frazier permeability (differential pressure set at 0.5 inch of water) of 650 ft/min (330 cm/sec).

In some embodiments, the filter media according to the present disclosure can include a protective layer. The protective layer can provide protection for the fine fiber material against, for example friction or abrasion, during transport of the fine fiber material, and/or during manufacture of a filter element. The filter media can include a single protective layer, or a first protective layer and a second protective layer, or greater than two protective layers. In some embodiments, a layer of fine fiber material is preferably disposed between a protective layer and a substrate material, as shown in one embodiment in FIG. 4. In some embodiments, a layer of fine fiber material is preferably disposed between a protective layer and a scrim.

A protective layer can include a woven, a nonwoven, and/or an extruded material. In some embodiments, a protective layer can be applied to the fine fiber material including, for example, a layer of fine fiber material, after it is formed. In some embodiments, the protective layer comprises paper; polyethylene (PE) including, for example, a polyethylene extruded mesh or polyethylene nonwoven; polyester film, including, for example, polyethylene terephthalate (PET), available under the trade name MYLAR; and/or spunbond polyester media.

In some embodiments, the protective layer can be removed from the fine fiber material before the filter media is incorporated in a filter structure. In a preferred embodiment, the protective layer is not removed from the fine fiber material before the filter media is incorporated in a filter structure. In an embodiment where the protective layer is not removed from the fine fiber material before the filter media is incorporated in a filter structure, the protective layer preferably has a permeability greater than the permeability of the substrate material. For example, the protective layer may have a permeability of greater than 800 ft/min, preferably greater than 1000 ft/min. In some embodiments, the protective layer may have a permeability of up to 1500 ft/min or up to 2000 ft/min. In an embodiment where the protective layer is not removed from the fine fiber material before the fine fiber material is incorporated in a filter structure, the protective layer can preferably include, for example, spunbond polyester media, including, for example, products available under the trade names REEMAY and MOPET, and, even more preferably, REEMAY Style#2004, a spunbonded polyester nonwoven fabric. In some embodiments, the protective layer includes polyethylene extruded mesh, for example, a product available under the trade name DELNET X220.

Methods of Forming the Fine Fiber Material

The methods described herein can in some embodiments be used with the filter media described above.

The fine fiber material may be formed by any suitable method that allows the formation of fine fibers. In preferred embodiments, fine fiber material of the disclosure can preferably be made using an electrospinning process. A suitable electrospinning apparatus for forming the fine fibers includes a reservoir in which the fine fiber forming solution is contained, and an emitting device, which generally consists of a plurality of offset holes. As the solution is pumped out of the hole into the place surrounded by the electrostatic field, a droplet of the solution on the emitting device is accelerated by the electrostatic field toward the collecting media. The solution emitting device that contains holes, can be stationary, or can move in space. Movement can be, for example, rotary or reciprocating. Facing the emitter, but spaced apart therefrom, is a grid upon which the collecting media (i.e., a substrate material, a combined substrate, and/or a scrim) is positioned. Air can be drawn through the grid. A high voltage potential is maintained between emitter and grid by means of a suitable voltage source. A substrate material is positioned in between the emitter and grid to collect the fiber.

Specifically, the voltage potential between grid and the emitter imparts a charge to the material which causes liquid to be emitted therefrom as thin fibers which are drawn toward grid where they arrive and are collected on substrate. In the case of the polymer solution, a portion of the solvent is evaporated off the fibers during their flight to the substrate. The fine fibers bond to the substrate material as the solvent continues to evaporate and the fiber dries. Electrostatic potential is selected to ensure that, as the polymer material is accelerated from the emitter to the collecting media, the acceleration is sufficient to render the polymer material into a very thin microfiber or nanofiber structure. Increasing or slowing the advance rate of the collecting media can deposit more or fewer emitted fibers on the forming media, thereby allowing control of the thickness of each layer deposited thereon.

The polymer material (e.g., single polymer or polymer mixture or blend) is selected such that it can be combined in a solution or dispersion or in the melt. In some embodiments, the polymer material includes a SAN copolymer. In some embodiments, preferably the only polymer included in the polymer material is SAN copolymer. In preferred embodiments, the polymer material does not include polypropylene. In some embodiments, the polymer includes less than 5 weight percent (wt %), less than 2 wt %, less than 1 wt %, less than 0.05 wt %, or less than 0.01 wt % of polypropylene. In some embodiments, preferably the only polymers included in the SAN copolymer are acrylonitrile and styrene. The SAN copolymer can include varying amounts of acrylonitrile and styrene including, for example, 50% acrylonitrile and 50% styrene; 40% acrylonitrile and 60% styrene; 30% acrylonitrile and 70% styrene; 20% acrylonitrile and 80% styrene; and 10% acrylonitrile and 90% styrene.

In some embodiments, the SAN copolymer includes at least 5% acrylonitrile, at least 10% acrylonitrile, at least 20% acrylonitrile, at least 25% acrylonitrile, at least 30% acrylonitrile, at least 40% acrylonitrile, or at least 50% acrylonitrile. In some embodiments, the SAN copolymer includes up to 10% acrylonitrile, up to 20% acrylonitrile, up to 25% acrylonitrile, up to 30% acrylonitrile, up to 40% acrylonitrile, up to 50% acrylonitrile, up to 60% acrylonitrile, up to 70% acrylonitrile, up to 80% acrylonitrile, or up to 90% acrylonitrile.

In some embodiments, the SAN copolymer includes at least 5% styrene, at least 10% styrene, at least 20% styrene, at least 25% styrene, at least 30% styrene, at least 40% styrene, at least 50% styrene, at least 60% styrene, at least 70% styrene, or at least 80% styrene. In some embodiments, the SAN copolymer includes up to 50% styrene, up to 60% styrene, up to 70% styrene, up to 75% styrene, up to 80% styrene, or up to 90% styrene. In a preferred embodiment, the SAN copolymer includes 25% acrylonitrile and 75% styrene.

In some embodiments, the styrene/acrylonitrile (SAN) copolymer includes 10% to 90% styrene and 10% to 90% acrylonitrile.

For a fiber made from a SAN copolymer, the density of the fiber is 1080 kilograms per cubic meter (kg/m$^3$)±6.5%. For a fiber made from a SAN copolymer having 25% acrylonitrile and 75% styrene, the density of the fiber is 1080 kg/m$^3$. Thus, a fiber having a diameter of 11.4 μm is approximately 1 denier (defined as the mass in grams per 9000 meters). Typically, for a fiber made from a SAN copolymer having 25% acrylonitrile and 75% styrene, a fine fiber is less than 1 denier, preferably less than 0.5 denier, or more preferably less than 2 decideniers.

In some embodiments, the fine fibers are preferably formed without the use of stabilizers and/or antioxidants including, including for example, compounds available under the trade name IRGAFOS including, for example, compounds available from Ciba under the trade name IRGAFOS 168 (Tris(2,4-di-tert-butylphenyl) phosphite); or compounds available from Ciba under the trade name IRGANOX 1010 (pentaerythritol tetrakis 3-(3,5-di-tert-butyl-4-hydroxyphenyl)propionate); etc. In some embodiments, a filter media including the fine fibers includes less than 5 wt %, less than 2 wt %, less than 1 wt %, less than 0.05 wt %, or less than 0.01 wt % of a stabilizer and/or antioxidants. In some embodiments, a filter media including the fine fibers includes less than 5 wt %, less than 2 wt %, less than 1 wt %, less than 0.05 wt %, or less than 0.01 wt % of Tris(2,4-di-tert-butylphenyl) phosphite and/or pentaerythritol tetrakis 3-(3,5-di-tert-butyl-4-hydroxyphenyl) propionate.

In some embodiments, the polymer materials are combined in a solution. In some embodiments, the polymer materials are combined in a solution including an organic solvent, preferably a chlorinated solvent. In a preferred embodiment, the polymer materials are combined in a solution including dicloroethane as a solvent. Dichloroethane can include, for example, 1,1-dichloroethane (ethylidene dichloride) and/or 1,2-dichloroethane (ethylene dichloride). Without wishing to be bound by theory, it is believed that the use of dichloroethane allows the formation of more rigid fibers than the use of solvents having a higher boiling point such as butyl acetate.

In some embodiments, the conductivity of the solution is at least $4\times10^{-6}$ Ohm$^{-1}$/cm or at least $3\times10^{-6}$ Ohm$^{-1}$/cm. In some embodiments, the conductivity of the solution is up to $4\times10^{-5}$ Ohm$^{-1}$/cm or up to $3\times10^{-5}$ Ohm$^{-1}$/cm. In some embodiments, the conductivity of the solution is $2\times10^{-5}$ Ohm$^{-1}$/cm.

In some embodiments, the electrostatic potential is 60 kilovolts (kV) to 120 kV, 70 kV to 110 kV, or 80 kV to 100 kV. In some embodiments, the electrostatic potential is at least 60 kV, at least 70 kV, at least 80 kV, or at least 85 kV. In some embodiments, the electrostatic potential is up to 95 kV, up to 100 kV, up to 110 kV, or up to 120 kV. In some embodiments, the electrostatic potential is 90 kV.

During electrospinning, the polymer material is accelerated from the emitter to the substrate material and/or collecting media. In some embodiments, the distance between the emitter and the substrate material is at least 20 cm, at least 30 cm, at least 40 cm, or at least 45 cm. For example, the distance between the emitter and the substrate material can be 45 cm to 50 cm, or preferably 45 cm to 48 cm. In certain embodiments, the distance between the emitter and the substrate material is up to 45 cm, up to 48 cm, up to 50 cm, or up to 60 cm. In some embodiments, the distance between the emitter and the substrate is 45 cm. Without wishing to be bound by theory, it is believed that the distance between the emitter and the substrate affects the orientation of the fibers on the substrate material. While a shorter distance such as, for example, 30 cm to 35 cm, results in fibers being oriented parallel to the substrate material, increasing the distance between the emitter and the substrate material results in an increased proportion of fibers being oriented perpendicular to the substrate material.

The fine fibers can be collected on a substrate material to form a fine fiber material. In some embodiments, the fine fibers may be collected on a substrate material including fibers having a diameter of greater than 10 μm. In some embodiments, the fine fibers are preferably collected on a scrim during fiber formation. Preferably, the fine fiber material disposed on a surface of a substrate material and/or scrim material forms a layer. Also, in some embodiments, the layer of fine fiber material disposed on the surface of the substrate material has an overall thickness that is no greater than 1.0 mm, preferably no greater than 0.6 mm, more preferably no greater than 0.3 mm, and most preferably no greater than 0.2 mm. In certain embodiments, the fine fiber layer has a thickness of at least 0.05 mm.

The fine fiber layer or the fine fiber layer and the substrate material can be manufactured into a filter structure (i.e., filter element or filtration element), including, for example, a recirculation filter. Examples of such recirculation filters are described in U.S. Pat. Nos. 5,997,618; 8,885,291; and 9,153,291. The shape and structure of the filter structure, however, is typically selected by the design engineer and depends on the particular filtration application.

Figure 5:
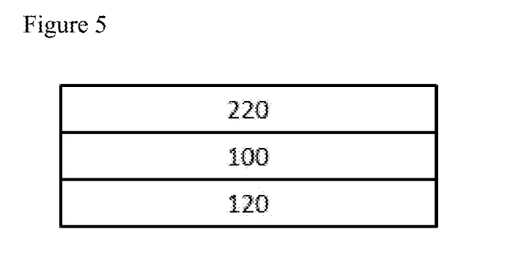
FIG. 5 shows a schematic representation of one embodiment of a filter media.

For example, in some embodiments, a filter media can include a fine fiber material that is disposed between a first substrate material and a second substrate material, as shown in one embodiment in FIG. 5. The first substrate material and the second substrate material can be the same material or different materials.

In some embodiments, the filter media can include a first fine fiber material that includes a SAN copolymer and a second fine fiber material that includes a SAN copolymer. The first fine fiber material and the second fine fiber material can, in some embodiments, be disposed between a first substrate material and a second substrate material and/or a first scrim material and a second scrim material, as shown in one embodiment in FIG. 6A. In some embodiments, the filter media further comprises a third substrate material, and the first fine fiber material is disposed between the first substrate material and the second substrate material and the second fine fiber material is disposed between the second substrate material and the third substrate material, as shown in one embodiment in FIG. 6B. The first substrate material, the second substrate material, and/or the third substrate material can be the same material or different materials.

In some embodiments, the filter media may further include additional layers including, for example a layer including an adsorbent media. In one illustrative embodiment, the layer including an adsorbent media may be disposed between a first fine fiber material and a second fine fiber material. In some embodiments, it may be preferred for a layer including an adsorbent media to be disposed between a first fine fiber material and a second fine fiber material, and the first fine fiber material and the second fine fiber material to be disposed between a first substrate material and a second substrate material, as shown in one embodiment in FIG. 7 and in one embodiment of a recirculation filter in FIG. 11.

The layer including an adsorbent media may be provided for the removal of chemical contaminants. The layer including an adsorbent media may include a single layer or may include more than one layer wherein at least one layer includes adsorbent media. The adsorbent media generally removes contaminants from the air entering the enclosure atmosphere by either adsorption or absorption. As used throughout this application, the terms "adsorb," "adsorption," "adsorbent" and the like, are intended to also include the mechanism of absorption. Typically, the adsorbent media is selected to be stable and adsorb contaminants within normal disk drive operating temperatures. In some embodiments, normal operating temperatures may be at least −40 degrees Celsius (° C.), at least −20° C., at least 0° C., or at least 10° C. In some embodiments, normal operating temperatures may be up to 50° C., up to 60° C., up to 70° C., up to 80° C., or up to 90° C.

The adsorbent media may adsorb one or more types of contaminants, including, for example, water, water vapor, acid gas, and volatile organic compounds. A filter element including a layer of adsorbent media and/or the absorbent media may include a physisorbent or chemisorbent material, such as, for example, a desiccant (i.e., a material that adsorbs or absorbs water or water vapor) or a material that adsorbs or absorbs volatile organic compounds, acid gas, or both. Suitable adsorbent materials include, for example, activated carbon, impregnated carbon, activated alumina, molecular sieves, silica gel, and silica. These materials or a non-adsorbent substrate can be combined with or impregnated with, for example, potassium permanganate, calcium carbonate, potassium carbonate, sodium carbonate, calcium sulfate, or mixtures thereof. Although adsorbent media can be a single adsorbent material, mixtures of materials are also useful, for example, silica gel can be blended with carbon particles. In some embodiments, the adsorbent media includes layers or combinations of adsorbent material, so that different contaminants are selectively removed as they pass through or by the different adsorbent materials.

The adsorbent media can be a powder (for example, a powder that passes through 100 mesh) or granular material (28 to 200 mesh). Alternately, the adsorbent media can be provided in a form, such as a granule, bead, or tablet that optionally can be shaped. The adsorbent media can have a variety of shapes. For example, a shaped adsorbent media can be shaped as a disk, a tablet, a wafer, a cylinder, a parallelepiped, or a cube. The size of the shaped adsorbent media can depend on factors such as, for example, the size of the device in which the filter media is to be used, the volume of fluid to be filtered, the expected lifetime of the filter assembly, and the density of the filter media.

A shaped adsorbent media can be formed from a free-flowing particulate material combined with a solid or liquid binder that is then shaped into a non-free-flowing article. The shaped adsorbent media can be formed by, for example, a molding (e.g., a compression molding or injection molding), or an extrusion process. The adsorbent media can be disposed, for example, coated or adsorbed, on a substrate.

Preferably the composition of a shaped adsorbent media includes at least about 70%, by weight, and typically not more than about 98%, by weight, adsorbent material. In some instances, the shaped adsorbent media includes 85% to 95%, preferably, approximately 90%, by weight, adsorbent material. The shaped adsorbent media typically includes not less than about 2% by weight, binder and not more than about 30% by weight, binder. Further information regarding mold release, other additives, and molding techniques are discussed in U.S. Pat. Nos. 5,876,487, 6,146,446, and 6,168,651.

Figure 8:
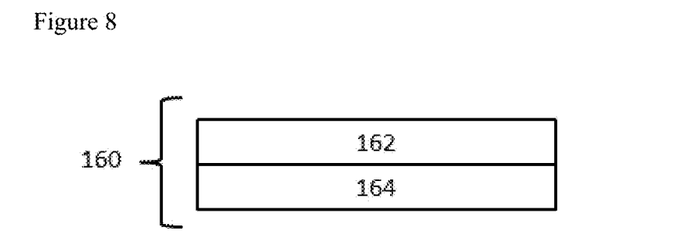
FIG. 8 shows a schematic representation of one embodiment of a layer including an adsorbent media.

In some embodiments, the layer including adsorbent media includes a porous support layer, and adsorbent media disposed on the porous support layer, as shown in one embodiment in FIG. 8. For example, a mesh or scrim can be used as the porous support layer to hold adsorbent media. Polyester and other suitable materials (such as polypropylene, polyethylene, nylon and PTFE) can be used as the mesh or scrim. The porous support layer can be used as a base on which the adsorbent media is disposed, or the porous support layer can be provided on or around the exterior of a mass of adsorbent media to hold the material together or to prevent or reduce the loss of adsorbent material by, for example, flaking. Optionally, the adsorbent media can be mounted on the porous support layer using, for example, an adhesive.

In some embodiments, the layer including adsorbent media preferably includes activated carbon. In a preferred embodiment, the layer including adsorbent media includes activated carbon beads attached to a porous support layer. In some embodiments, the layer including adsorbent media has a thickness of at least 1 mm, at least 1.2 mm, at least 1.3 mm, or at least 1.4 mm. In some embodiments, the layer including adsorbent media has a thickness of at up to 1.5 mm, up to 1.6 mm, up to 1.8 mm, or up to 2 mm.

In some embodiments, the filter media can include a fine fiber material that includes a SAN copolymer, a substrate material, and a protective layer. In some embodiments, it is preferred for the fine fiber material to be disposed between the substrate material and the protective layer. The filter media can further include a second fine fiber material that includes a SAN copolymer, a second substrate material, and a second protective layer. In some embodiments, it is preferred for the first fine fiber material to be disposed between the first protective layer and the first substrate material, and the second fine fiber material to be disposed between the second protective layer and the second substrate material, as shown in one embodiment in FIG. 9.

Figure 10:
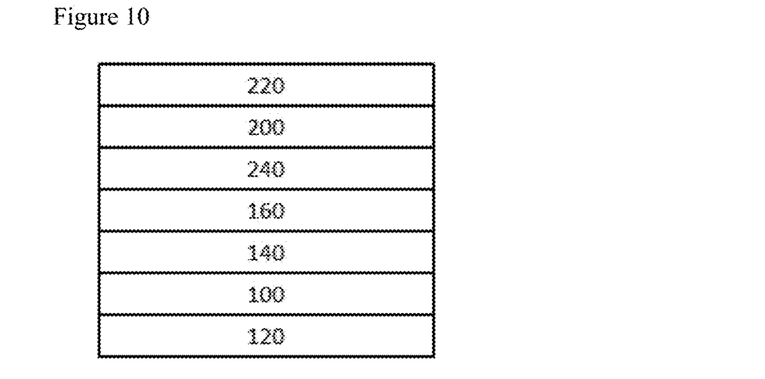
FIG. 10 shows a schematic representation of one embodiment of a filter media.

In some embodiments, the filter media includes a layer including adsorbent media, and the layer including adsorbent media can disposed between a first protective layer and a second protective layer, a first fine fiber material can be disposed between the first protective layer and a first substrate material, and a second fine fiber material can be disposed between the second protective layer and a second substrate material, as shown in one embodiment in FIG. 10. The layer including adsorbent media may have the same or a similar length and width as a layer of fine fiber material, a layer of substrate material, and/or a protective layer; for example, the layer including adsorbent media may lie between a first protective layer and a second protective layer and may be coextensive with the first protective layer and the second protective layer. In some embodiments, however, the layer including adsorbent media may not be coextensive with a layer of fine fiber material, a layer of substrate material, and/or a protective layer. For example, the layer including adsorbent media may have a length and/or a width smaller than the length and/or the width fine fiber material, a layer of substrate material, and/or a protective layer. The layer including adsorbent media may lie between a first protective layer and a second protective layer and may have a length and a width smaller than the length and the width of the first protective layer and the length and the width of the second protective layer.

In some embodiments, the filter media is included in a filter structure such as a recirculation filter. A recirculation filter including the filter media described herein preferably provides comparable particle clean-up (PCU) time and particle removal rates to recirculation filters currently used in the disk drive industry. For example, the time to 90% of the total drive clean-up of upstream particles can be 5 seconds to 30 seconds, more preferably 9 seconds to 13 seconds. In some embodiments, the time to 90% of the total drive clean-up of upstream particles can be at least 5 seconds, at least 6 seconds, at least 7 seconds, at least 8 seconds, or at least 9 seconds. In some embodiments, the time to 90% of the total drive clean-up of upstream particles can be up to 13 seconds, up to 15 seconds, up to 20 seconds, or up to 30 seconds. Particle size can be evaluated using 0.1 μm polystyrene particles.

In some embodiments, the recirculation filter may be used, for example, to purify the air in an electronics enclosure including, for example, a hard disk drive enclosure. For example, the recirculation filter may be used to remove certain organic vapor contaminants, certain particulate contaminants, or both. In a preferred embodiment, certain particulate and vaporous contaminants are removed from the environment inside a hard disk drive enclosure and are not released into the stream of air during normal disk drive operating conditions.

The filter media described herein can have a Figure of Merit, a measure of the performance of a filter media and of the filter media's ability to provide a certain level of clarification of a stream with a minimum energy used. In some embodiments, the Figure of Merit of the filter media may be 500 (cm/sec)/(centimeters of mercury (cm Hg)) to 2000 (cm/sec)/(cm Hg) or 800 (cm/sec)/(cm Hg) to 1700 (cm/sec)/(cm Hg) at 0.3 μm and 10.5 ft/min (5.3 cm/sec). In some embodiments, the Figure of Merit of the filter media may be at least 500 (cm/sec)/(cm Hg) or at least 800 (cm/sec)/(cm Hg) at 0.3 μm and 10.5 ft/min (5.3 cm/sec). In some embodiments, the Figure of Merit of the filter media may be up to 1700 (cm/sec)/(cm Hg) or up to 2000 (cm/sec)/(cm Hg) at 0.3 μm and 10.5 ft/min (5.3 cm/sec).

In some embodiments, the Figure of Merit of a fine fiber material and a substrate material may be 500 (cm/sec)/(cm Hg) to 2000 (cm/sec)/(cm Hg), 500 (cm/sec)/(cm Hg) to 1700 (cm/sec)/(cm Hg), 800 (cm/sec)/(cm Hg) to 1700 (cm/sec)/(cm Hg) or 500 (cm/sec)/(cm Hg) to 1500 (cm/sec)/(cm Hg) at 0.3 μm and 10.5 ft/min (5.3 cm/sec). In some embodiments, the Figure of Merit of a fine fiber material and a substrate material may be at least 500 (cm/sec)/(cm Hg) or at least 800 (cm/sec)/(cm Hg) at 0.3 μm and 10.5 ft/min (5.3 cm/sec). In some embodiments, the Figure of Merit of a fine fiber material and a substrate material may be up to 1700 (cm/sec)/(cm Hg) or up to 2000 (cm/sec)/(cm Hg) at 0.3 μm and 10.5 ft/min (5.3 cm/sec).

In some embodiments, the Figure of Merit of a fine fiber material, a substrate material, and a protective layer may be 500 (cm/sec)/(cm Hg) to 2000 (cm/sec)/(cm Hg) or 1000 (cm/sec)/(cm Hg) to 2000 (cm/sec)/(cm Hg) at 0.3 μm and 10.5 ft/min (5.3 cm/sec). In some embodiments, the Figure of Merit of a fine fiber material, a substrate material, and a protective layer may be at least 500 (cm/sec)/(cm Hg) or at least 800 (cm/sec)/(cm Hg) at 0.3 μm and 10.5 ft/min (5.3 cm/sec). In some embodiments, the Figure of Merit of a fine fiber material, a substrate material, and a protective layer may be up to 1700 (cm/sec)/(cm Hg) or up to 2000 (cm/sec)/(cm Hg) at 0.3 μm and 10.5 ft/min (5.3 cm/sec).

It is to be understood that other embodiments may be utilized and structural changes may be made without departing from (e.g., still falling within) the scope of the disclosure presented hereby.

It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others. Embodiments of the invention will be further described, by way of example only, with reference to the accompanying drawings in which:

FIG. 3A shows a schematic representation of one embodiment of a filter media according to the present disclosure. The filter media includes a substrate material 120, wherein a fine fiber material 100 is disposed on the substrate material 120. A substrate material 120 may have a surface, and the fine fiber material 100 may preferably be disposed on the surface of the substrate material.

FIG. 3B shows a schematic representation of one embodiment of a filter media according to the present disclosure. The filter media includes a substrate material 120, wherein the fine fiber material 100 is disposed on the substrate material 120. In some embodiments, the finer fiber material forms a layer 101 and/or the substrate material form a layer 121.

Figure 4:
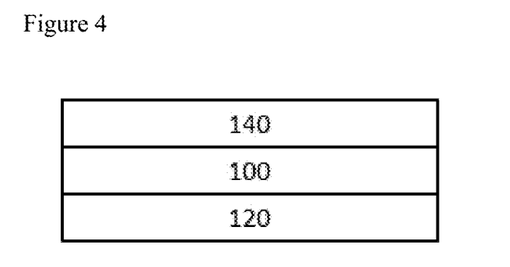
FIG. 4 shows a schematic representation of one embodiment of a filter media.

FIG. 4 shows a schematic representation of one embodiment of a filter media according to the present disclosure. A layer of fine fiber material 100 is disposed between a protective layer 140 and a substrate material 120.

FIG. 5 shows a schematic representation of one embodiment of a filter media according to the present disclosure. The filter media includes a fine fiber material 100 that is disposed between a first substrate material 120 and a second substrate material 220.

Figure 6A:
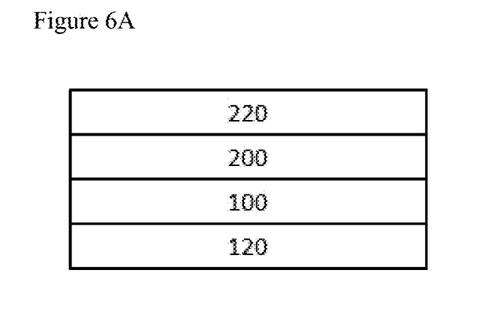
FIG. 6A shows a schematic representation of one embodiment of a filter media.

FIG. 6A shows a schematic representation of one embodiment of a filter media according to the present disclosure. The filter media includes a first fine fiber material 100 and a second fine fiber material 200. The first fine fiber material 100 and the second fine fiber material 200 are disposed between a first substrate material 120 and a second substrate material 220.

Figure 6B:
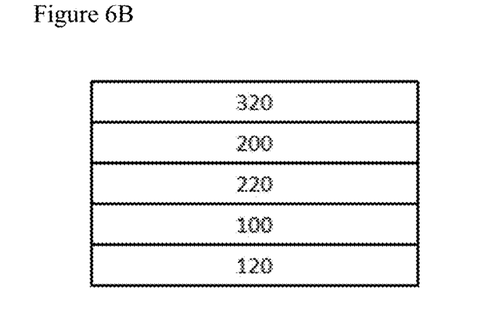
FIG. 6B shows a schematic representation of one embodiment of a filter media.

FIG. 6B shows a schematic representation of one embodiment of a filter media according to the present disclosure. The filter media includes a first fine fiber material 100 that includes a SAN copolymer and a second fine fiber material 200 that includes a SAN copolymer. The first fine fiber material 100 and the second fine fiber material 200 are disposed between a first substrate material 120 and a second substrate material 220. The filter media further includes a third substrate material 320, and the first fine fiber material 100 is disposed between the first substrate material 120 and the second substrate material 220 and the second fine fiber material 200 is disposed between the second substrate material 220 and the third substrate material 320.

Figure 7:
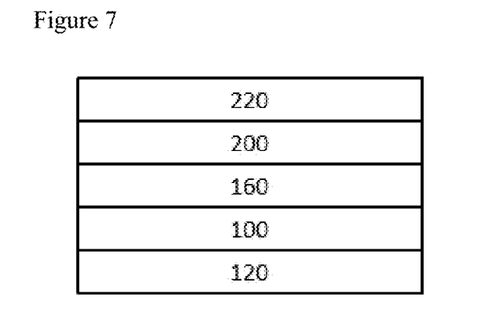
FIG. 7 shows a schematic representation of one embodiment of a filter media.

FIG. 7 shows a schematic representation of one embodiment of a filter media according to the present disclosure. The filter media includes a first fine fiber material 100, a second fine fiber material 200, a first substrate material 120, a second substrate material 220, and a layer including an adsorbent media 160. The layer including an adsorbent media 160 is disposed between the first fine fiber material 100 and the second fine fiber material 200, and the first fine fiber material 100 and the second fine fiber material 200 are disposed between the first substrate material 120 and the second substrate material 220.

FIG. 8 shows a schematic representation of one embodiment of a layer including adsorbent media 160 according to the present disclosure. In some embodiments, the layer including adsorbent media 160 includes a porous support layer 164, and adsorbent media 162 disposed on the porous support layer 164.

Figure 9:
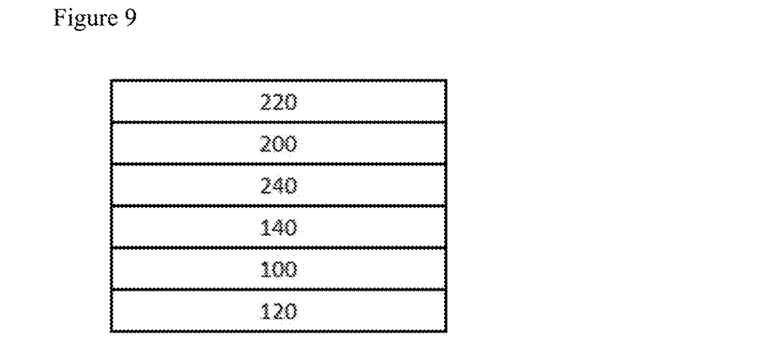
FIG. 9 shows a schematic representation of one embodiment of a filter media.

FIG. 9 shows a schematic representation of one embodiment of a filter media according to the present disclosure. The filter media includes a fine fiber material 100, a substrate material 120, a protective layer 140, a second fine fiber material 200, a second substrate material 220, and a second protective layer 240. The first fine fiber material 100 is disposed between the first protective layer 140 and the first substrate material 120, and the second fine fiber material 200 is disposed between the second protective layer 240 and the second substrate material 220. At least a portion of a surface of the first protective layer 140 is adjacent to at least a portion of a surface of the second protective layer 240.

FIG. 10 shows a schematic representation of a filter media according to the present disclosure. The filter media includes a layer including adsorbent media 160. In some embodiments, the layer including adsorbent media 160 preferably comprises carbon including, for example, activated carbon or activated carbon beads. The layer including adsorbent media 160 is disposed between a first protective layer 140 and a second protective layer 240, a first fine fiber material 100 is disposed between the first protective layer 140 and a first substrate material 120, and a second fine fiber material 200 is disposed between the second protective layer 240 and a second substrate material 220. In some embodiments, the layer including adsorbent media 160 may be coextensive with the first protective layer 140 and the second protective layer 240. In some embodiments, the layer including adsorbent media 160 may lie between a first protective layer 140 and a second protective layer 240 and may have a length and a width smaller than the length and the width of the first protective layer 140 and the length and the width of the second protective layer 240.

Figure 11:
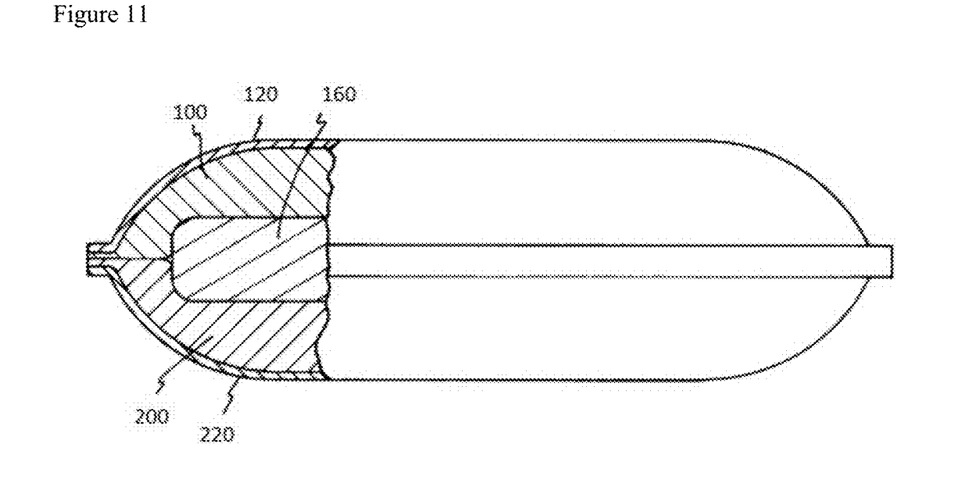
FIG. 11 shows one embodiment of a recirculation filter.

FIG. 11 shows a schematic representation of one embodiment of a recirculation filter. The recirculation filter includes a first fine fiber material 100, a second fine fiber material 200, a first substrate material 120, a second substrate material 220, and a layer including an adsorbent media 160. The layer including an adsorbent media 160 is disposed between the first fine fiber material 100 and the second fine fiber material 200, and the first fine fiber material 100 and the second fine fiber material 200 are disposed between a first substrate material 120 and a second substrate material 220.

Exemplary Filter Media Embodiments

1. A filter media comprising
   a fine fiber material comprising a styrene/acrylonitrile (SAN) copolymer; and
   a substrate material,
   wherein the fine fiber material is disposed on the substrate.
2. The filter media of Embodiment 1, wherein the basis weight of the fine fiber material is 5 g/m$^2$ to 20 g/m$^2$.
3. The filter media of either Embodiment 1 or Embodiment 2, wherein the basis weight of the fine fiber material is 5 g/m$^2$ to 12.5 g/m$^2$.
4. The filter media of any of Embodiments 1 to 3, wherein the basis weight of the fine fiber material is 9 g/m$^2$ to 12.5 g/m$^2$.
5. The filter media of any of Embodiments 1 to 4, wherein the permeability of the fine fiber material and the substrate material is 100 ft/min (50.8 cm/sec) to 1000 ft/min (508 cm/sec) at 0.5 inches of water (125 Pa).
6. The filter media of any of Embodiments 1 to 5, wherein the permeability of the fine fiber material and the substrate material is 140 ft/min (71.1 cm/sec) to 400 ft/min (203 cm/sec) at 0.5 inches of water (125 Pa).
7. The filter media of any of Embodiments 1 to 6, wherein the permeability of the fine fiber material and the substrate material is 140 ft/min (71.1 cm/sec) to 250 ft/min (127 cm/sec) at 0.5 inches of water (125 Pa).
8. The filter media of any of Embodiments 1 to 7, wherein the efficiency of the fine fiber material and the substrate material is 45% to 99.99% for 0.3 μm Di-Ethyl-Hexyl-Sebacat (DEHS) particles at 10.5 ft/min (5.3 cm/sec).
9. The filter media of Embodiment 8, wherein the efficiency of the fine fiber material and the substrate material is 55% to 96%.
10. The filter media of any of Embodiments 1 to 9, wherein the fine fiber material forms a layer having a thickness and the thickness of the layer of the fine fiber material and the substrate material is 2.5±0.5 mm.
11. The filter media of any of Embodiments 1 to 9, wherein the fine fiber material forms a layer having a thickness and the thickness of the layer of the fine fiber material and the substrate material is 2.5 mm±0.2 mm.
12. The filter media of any of Embodiments 1 to 11, wherein the fine fiber material forms a layer having a thickness and the thickness of the layer of the fine fiber material is less than 1.0 mm.
13. The filter media of any of Embodiments 1 to 12, wherein the fine fiber material forms a layer having a thickness and the thickness of the layer of the fine fiber material is less than 0.6 mm.
14. The filter media of any of Embodiments 1 to 13, wherein the fine fiber material forms a layer having a thickness and the thickness of the layer of the fine fiber material is less than 0.3 mm.
15. The filter media of any of Embodiments 1 to 14, wherein the substrate material is a woven material.
16. The filter media of any of Embodiments 1 to 15, wherein the substrate material is a nonwoven material.
17. The filter media of any of Embodiments 1 to 16 wherein the substrate material comprises a polyester material.
18. The filter media of any of Embodiments 1 to 17, wherein the substrate material has a basis weight of 45 g/m$^2$ to 85 g/m$^2$, a thickness of 0.10 mm to 0.15 mm, and a permeability of 550 ft/min to 750 ft/min (279 to 381 cm/sec) at 0.5 inches of water (125 Pa).
19. The filter media of any of Embodiments 1 to 18, wherein the substrate material has a basis weight of 58 g/m$^2$, a thickness of 0.110 mm, and a permeability of 650 ft/min (330 cm/sec) at 0.5 inches of water (125 Pa).
20. The filter media of any of Embodiments 1 to 19, wherein the substrate material is a first substrate material, and further wherein the fine fiber material is disposed between the first substrate material and a second substrate material.
21. The filter media of any of Embodiments 1 to 20, wherein the fine fiber material is disposed between the substrate material and a protective layer.
22. The filter media of Embodiment 21, wherein the protective layer comprises at least one of a polyethylene extruded mesh, a polyethylene nonwoven, or a polyester nonwoven.

23. The filter media of Embodiment 21 or 22, wherein the protective layer has a permeability greater than the permeability of the substrate material.
24. The filter media of any of Embodiments 21 to 23, wherein the protective layer has a permeability greater than 1000 ft/min (508 cm/sec) at 0.5 inches of water (125 Pa).
25. The filter media of any of Embodiments 21 to 24, wherein the protective layer has a permeability greater than 800 ft/min (406 cm/sec) at 0.5 inches of water (125 Pa).
26. The filter media of any of Embodiments 1 to 25, wherein the fine fiber material is a first fine fiber material and the substrate material is a first substrate material, and further wherein the filter media further comprises a second fine fiber material comprising a styrene/acrylonitrile (SAN) copolymer and a second substrate material.
27. The filter media of Embodiment 26, wherein the first fine fiber material and the second fine fiber material are disposed between the first substrate material and the second substrate material.
28. The filter media of any of Embodiments 21 to 27, wherein the first substrate material and the second substrate material comprise the same material.
29. The filter media of Embodiment 28, wherein the filter media further comprises a third substrate material, and wherein the first fine fiber material is disposed between the first substrate material and the second substrate material and the second fine fiber material is disposed between the second substrate material and the third substrate material.
30. The filter media of Embodiment 29, wherein the first substrate material, the second substrate material, and the third substrate material comprise the same material.
31. The filter media of any of Embodiments 1 to 30, wherein the filter media further comprises a layer comprising an adsorbent media.
32. The filter media of Embodiment 31, wherein the layer comprising an adsorbent media comprises activated carbon.
33. The filter media of Embodiment 31, wherein the layer comprising an adsorbent media comprises beads comprising activated carbon.
34. The filter media of any of Embodiments 31 to 33, wherein the fine fiber material is a first fine fiber material and the substrate material is a first substrate material, and wherein the layer comprising an adsorbent media is disposed between the first fine fiber material and a second fine fiber material, and the first fine fiber material and the second fine fiber material are disposed between the first substrate material and a second substrate material.
35. The filter media of any of Embodiments 21 to 34, wherein the fine fiber material is a first fine fiber material and the protective layer is a first protective layer and the filter media further comprises second fine fiber material and a second protective layer, and the first fine fiber material is disposed between the first protective layer and the first substrate material, and the second fine fiber material is disposed between the second protective layer and the second substrate material.
36. The filter media of Embodiment 35, wherein a layer comprising an adsorbent media is disposed between the first protective layer and the second protective layer, the first fine fiber material is disposed between the first protective layer and the first substrate material, and the second fine fiber material is disposed between the second protective layer and the second substrate material.
37. The filter media of either of Embodiments 35 or 36, wherein the first protective layer and the second protective layer comprise the same material.
38. The filter media of any of Embodiments 1 to 37, wherein the fine fiber material and optional second fine fiber material comprise a monofilament comprising a styrene/acrylonitrile (SAN) copolymer.
39. The filter media of any of Embodiments 1 to 38, wherein the styrene/acrylonitrile (SAN) copolymer comprises 75% styrene and 25% acrylonitrile.
40. The filter media of any of Embodiments 1 to 38, wherein the styrene/acrylonitrile (SAN) copolymer comprises up to 75% styrene.
41. The filter media of any of Embodiments 1 to 38 or 40, wherein the styrene/acrylonitrile (SAN) copolymer comprises up to 25% acrylonitrile.
42. The filter media of any of Embodiments 1 to 38, wherein the styrene/acrylonitrile (SAN) copolymer comprises 10% to 90% styrene and 10% to 90% acrylonitrile.
43. The filter media of any of Embodiments 1 to 42, wherein the filter media includes less than 5 wt % of a stabilizer or an antioxidant.
44. The filter media of any of Embodiments 1 to 42, wherein the filter media includes less than 0.05 wt % of a stabilizer or an antioxidant.
45. The filter media of any of Embodiments 1 to 44, wherein the filter media includes less than 5 wt % of Tris(2,4-di-tert-butylphenyl) phosphite.
46. The filter media of any of Embodiments 1 to 45, wherein the filter media includes less than 0.05 wt % of Tris(2,4-di-tert-butylphenyl) phosphite.
47. The filter media of any of Embodiments 1 to 45, wherein the filter media wherein the filter media includes less than 5 wt % of polypropylene.
48. The filter media of any of Embodiments 1 to 47, wherein the filter media wherein the filter media includes less than 0.05 wt % of polypropylene.
49. The filter media of any of Embodiments 1 to 48, wherein Figure of Merit of the fine fiber layer and the first substrate material is 500 (cm/sec)/(cm Hg) to 2000 (cm/sec)/(cm Hg) at 0.3 µm and 10.5 ft/min (5.3 cm/sec).
50. The filter media of any of Embodiments 1 to 49, wherein Figure of Merit of the fine fiber layer, the first substrate material, and the first protective layer is 500 (cm/sec)/(cm Hg) to 2000 (cm/sec)/(cm Hg) at 0.3 µm and 10.5 ft/min (5.3 cm/sec).
51. A filter element comprising a filter media of any one of Embodiments 1 through 50.
52. A recirculation filter comprising a filter media of any one of Embodiments 1 through 50.
53. The recirculation filter of Embodiment 52, wherein the recirculation filter is adapted for use in an electronic enclosure.
54. The recirculation filter of either of Embodiments 52 or 53, wherein the recirculation filter includes up to 5 wt % of a stabilizer, an antioxidant, or polypropylene.
55. The recirculation filter either of Embodiments 52 or 53, wherein the recirculation filter includes up to 0.05 wt % of a stabilizer, an antioxidant, or polypropylene.
56. A method of using the recirculation filter of any one of Embodiments 52 through 55.

Exemplary Method of Making Embodiments

1. A method of making fine fibers, the method comprising:
   providing a solution comprising styrene/acrylonitrile (SAN) copolymer and an organic solvent; and
   electrospinning the solution onto a substrate material, wherein the distance between an emitter and the substrate material is at least 40 cm.

2. The method of Embodiment 1, wherein the organic solvent comprises a chlorinated solvent.
3. The method of either of Embodiments 1 or 2, wherein the organic solvent comprises dichloroethane.
4. The method of Embodiment 3, wherein the dichloroethane comprises 1,2-dichloroethane.
5. The method of any of Embodiments 1 to 4, wherein the substrate material comprises a scrim.
6. The method of any of Embodiments 1 to 5, wherein the distance between an emitter and the substrate material is 40 cm to 50 cm.
7. The method of any of Embodiments 1 to 6, wherein the distance between an emitter and the substrate material is 45 cm.
8. The method of any of Embodiments 1 to 7, wherein the electrostatic potential is between 80 kV and 100 kV.
9. The method of any of Embodiments 1 to 8, wherein the electrostatic potential is 90 kV.
10. The method of any of Embodiments 1 to 9, wherein the conductivity of the solution is $4\times10^{-6}$ $Ohm^{-1}$/cm to $4\times10^{-5}$ $Ohm^{-1}$/cm.
11. The method of any of Embodiments 1 to 10, wherein the conductivity of the solution is $2\times10^{-5}$ $Ohm^{-1}$/cm.
12. The method of any of Embodiments 1 to 11, wherein the solution further comprises a salt of iodine tetraethylammonium.

EXAMPLES

Objects and advantages of this disclosure are further illustrated by the following examples, but the particular materials and amounts thereof recited in these examples, as well as other conditions and details, should not be construed to unduly limit this disclosure.

Test Procedures

Measurement of Basis Weight

Filter media basis weight is measured and reported as mass per unit of area and may be reported as either pounds per 3000 square feet ($ft^2$) or grams per square meter ($m^2$). The basis weight is calculated from a sample that is a minimum of 8 inches by 8 inches (203.2 mm by 203.2 mm) and is tested according to ASTM-D646-13.

Measurement of Thickness

Filter media thickness is measured with an Ames comparator at 0.5 PSI.

Measurement of Efficiency

Filtration efficiency is the characteristic of the filtration media that is related to the fraction of the particulate removed from the mobile stream. Efficiency is measured using a TSI 3160 fractional efficiency test bench using 0.3 μm Di-Ethyl-Hexyl-Sebacat (DEHS) particles at 10.5 ft/min (5.3 cm/sec).

Measurement of Permeability

The Frazier permeability (sometimes referred to as filter media permeability) is the linear air flow velocity through a medium at 0.5 inches of water (0.5" H2O) (125 Pa) when tested using a Textest FX3310, according to ASTM D737-04.

Calculating Figure of Merit, Penetration, Pressure Drop and Resistance

The Figure of Merit is an index used to compare media. Larger Figure of Merit values are generally better than smaller values. The Figure of Merit of a fiber mass can be calculated using the efficiency and permeability measurements described above. There are two common units for FOM: $kPa^{-1}$ and (cm/sec)/(cm Hg).

Figure of Merit in $kPa^{-1}$ (FOM 1) is calculated using the following formula:

$$FOM\ 1=-\ln(penetration)/\Delta P$$

ln(penetration) is the natural logarithm of penetration. Pressure drop (ΔP or dP) in kPa is determined form the permeability by the formula:

$$\Delta P=(10.5\ fpm/permeability)\times 0.125\ kPa$$

where permeability is in ft/min at 125 Pa. Penetration is determined by the following formula:

$$Penetration=1-(efficiency/100)$$

with efficiency being measured as described above.

Figure of Merit in (cm/sec)/(cm Hg) (FOM 2) is calculated using the following formula:

$$FOM\ 2=-\ln(penetration)/(resistance)$$

ln(penetration) is the natural logarithm of penetration. Penetration is calculated, as described above, by the following formula:

$$penetration=1-(efficiency/100)$$

with efficiency being measured as described above.

Resistance is calculated from the perm by the following formula:

$$Resistance=(0.1846)/permeability$$

where the permeability is in ft/min at 125 Pa.

Preparation & Testing

Example 1

Styrene/acrylonitrile (SAN) fine fibers were produced by electrospinning a solution of SAN (25% acrylonitrile) in 1,2-dichloroethane with concentration 20 wt % onto a woven polyester fiber substrate material having a Frazier permeability of 550 feet per minute (ft/min or fpm) to 750 ft/min, a basis weight of 58 g/$m^2$, a thickness of 0.10 mm to 0.15 mm, a yarn count of 140 per inch±10%, and a yarn diameter of 50 μm±5 To control the conductivity, up to 1% of a salt of iodine tetraethylammonium was added. To prevent drying of the solution on the surface of the emitter, the air in the spinning space was saturated with dichroethane vapor.

The solution's electroconductivity was $2\times10^{-5}$ $Ohm^{-1}$/cm. Viscosity of the solution was 6 St (with solution density 0.0006 $m^2$/s). Spinning was executed in an electrostatic field at a potential difference of 90 kV. Solution volume flowrate was 0.01 $cm^3$/s per forming element. The distance between the emitter and the substrate was 45 cm.

Example 2

Fine fibers were electrospun onto a woven polyester fiber substrate material, as in Example 1. A nonwoven layer of polyethylene terephthalate (PET) was placed on the opposite surface of the fine fiber layer as the substrate material.

Example 3

Fine fibers were electrospun onto a woven polyester fiber substrate material, as in Example 1. A nonwoven layer of polyethylene (PE) was placed on the opposite surface of the fine fiber layer as the substrate material.

Comparative Example 1

Fine fibers including SAN were produced according to the methods of EP 0 829 293 B1, Example 2, with the following differences. The solution included 25 wt % SAN, up to 1% of iodine tetraethylammonium, and dichloroethane remainder (74 wt %). The solution's electroconductivity was $2 \times 10^{-5}$ Ohm$^{-1}$/cm. Spinning was executed in an electrostatic field at a potential difference of at 60 kV. The distance between the emitter and the substrate was 25 cm.

As in Example 2 of EP 0 829 293 B1, viscosity of the solution was 1 Pa·s (8 St with solution density 1207 kg/m$^3$), and solution volume flowrate was 0.0025 cm$^3$/s per fiber forming element.

Example 4

Fine fibers were electrospun onto a woven polyester fiber substrate material, as in Example 1 except that the distance between the emitter and the substrate was varied.

Comparative Example 2

Examples 2, 3, 6, 9, and 10 of EP 0 829 293 B1.

Results

The basis weight and thickness of the fine fiber layer of Examples 1 to 3 and Comparative Example 1 were tested. Results are shown in Table 1.

TABLE 1

|  | Thickness of the fine fiber layer (mm) | Basis weight of the fine fiber material (g/m$^2$) |
|---|---|---|
| Example 1 | 0.064 | 11.51 |
| Example 2 | 0.128 | 9.86 |
| Example 3 | 0.064 | 11.51 |
| Comparative Example 1 | 0.340 | 66.14 |

The efficiency and permeability of the substrate and fine fiber layer of Example 1, and the substrate, fine fiber layer, and nonwoven layer of Examples 2 and 3 were measured. Figure of Merit (FOM) 1 and FOM 2 were calculated as described above. Results are shown in Table 2.

Figure 1:
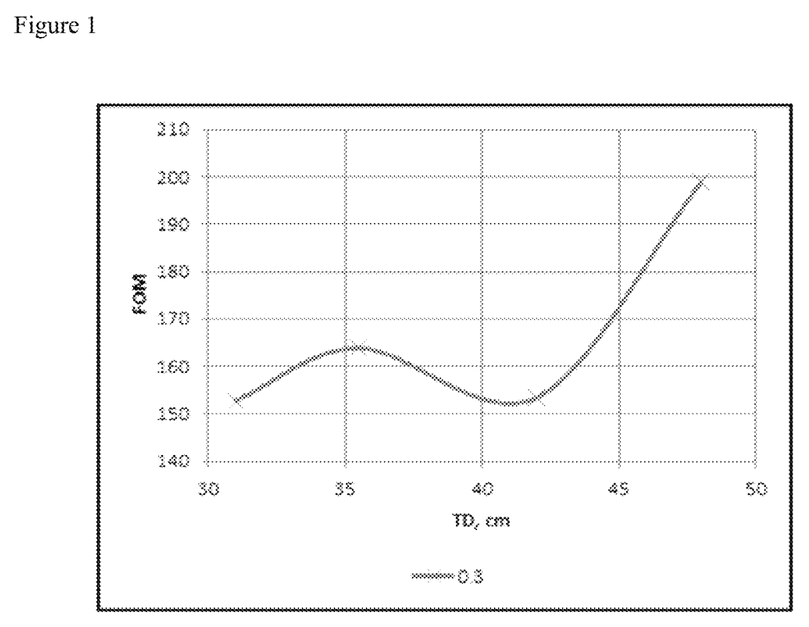
FIG. 1 shows the effect of varying the distance between the target and the emitter (TD) on Figure of Merit. Figure of Merit in $kPa^{-1}$ (FOM 1) was calculated from permeability and efficiency (as further described below), where efficiency was measured using a TSI 3160 fractional efficiency test bench using 0.3 µm Di-Ethyl-Hexyl-Sebacat (DEHS) particles at 10.5 ft/min (5.3 cm/sec).

The efficiency and permeability of the substrate and fine fiber layers of Example 4 were measured and used to calculate Figure of Merit in kPa$^{-1}$ (FOM 1). Results are shown in FIG. 1.

TABLE 2

| Structure Test Equipment | Efficiency TSI 3160 % | Permeability TexTest FX3300 fpm at 0.5" H2O | dP at 10.5 fpm kPa | Resistance (cm Hg)/ (cm/sec) | FOM 1 kPa$^{-1}$ | FOM 2 (cm/sec)/ (cm Hg) |
|---|---|---|---|---|---|---|
| Example 1 | 64.4 | 172.7 | 0.0076 | 0.0011 | 136 | 966 |
| Example 2 | 77.9 | 196.3 | 0.0067 | 0.0009 | 227 | 1608 |
| Example 3 | 75.6 | 143.0 | 0.0091 | 0.0013 | 154 | 1092 |
| Comparative Example 1 | 83.6 | 40.8 | 0.0321 | 0.0045 | 56 | 399 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:
1. A filter media comprising
   a fine fiber material comprising a styrene/acrylonitrile (SAN) copolymer, wherein the basis weight of the fine fiber material is 5 g/m$^2$ to 20 g/m$^2$ ; and
   a substrate material;
   wherein the fine fiber material is disposed on the substrate material;
   wherein the permeability of the fine fiber material and the substrate material is 100 ft/min (50.8 cm/sec) to 1000 ft/min (508 cm/sec) at 0.5 inches of water (125 Pa); and
   wherein Figure of Merit (FOM 2)=−ln(penetration)/(resistance)) of the fine fiber layer and the substrate material is 500 (cm/sec)/(cm/Hg) to 2000 (cm/sec)/ (cm/Hg) at 0.3 μm and 10.5 ft/min (5.3 cm/sec).
2. The filter media of claim 1, wherein the efficiency of the fine fiber material and the substrate material is 45% to 99.99% for 0.3 μm Di-Ethyl-Hexyl-Sebacat (DEHS) particles at 10.5 ft/min (5.3 cm/sec).
3. The filter media of claim 1, wherein the fine fiber material forms a layer having a thickness and the thickness of the layer of the fine fiber material is less than 1.0 mm.
4. The filter media of claim 1, wherein the substrate material has a basis weight of 45 g/m$^2$ to 85 g/m$^2$ , a thickness of 0.10 mm to 0.15 mm, and a permeability of 550 ft/min to 750 ft/min (279 to 381 cm/sec) at 0.5 inches of water (125 Pa).
5. The filter media of claim 1, wherein the fine fiber material is disposed between the substrate material and a protective layer.
6. The filter media of claim 1, wherein the fine fiber material is a first fine fiber material and the substrate material is a first substrate material, and further wherein the filter media further comprises a second substrate material and a second fine fiber material comprising a styrene/ acrylonitrile (SAN) copolymer, and wherein the first fine fiber material and the second fine fiber material are disposed between the first substrate material and the second substrate material.
7. The filter media of claim 1, wherein the filter media further comprises a layer comprising an adsorbent media.
8. The filter media of claim 7, wherein the layer comprising an adsorbent media comprises activated carbon.
9. The filter media of claim 7, wherein the fine fiber material is a first fine fiber material and the substrate material is a first substrate material, and wherein the layer comprising an adsorbent media is disposed between the first fine fiber material and a second fine fiber material comprising a styrene/acrylonitrile (SAN) copolymer, and the first fine fiber material and the second fine fiber material are disposed between the first substrate material and a second substrate material.

10. The filter media of claim 1, wherein the styrene/acrylonitrile (SAN) copolymer comprises 75% styrene and 25% acrylonitrile.

11. The filter media of claim 1, wherein the styrene/acrylonitrile (SAN) copolymer comprises 10% to 90% styrene and 10% to 90% acrylonitrile.

12. The filter media of claim 1, wherein the filter media includes less than 5 wt% of a stabilizer or an antioxidant.

13. A filter element comprising a filter media of claim 1.

14. A recirculation filter comprising a filter media of claim 1.

15. The recirculation filter of claim 14, wherein the recirculation filter is adapted for use in an electronic enclosure.

16. A method of using the recirculation filter of claim 14, the method comprising passing air comprising an organic vapor contaminant or a particulate or both through the recirculation filter.

17. A method of making fine fibers, the method comprising:
providing a solution comprising styrene/acrylonitrile (SAN) copolymer and dichloroethane; and
electrospinning the solution onto a substrate material to form a fine fiber material, wherein the distance between an emitter and the substrate material is at least 40 cm, and
wherein Figure of Merit (FOM 2)=−ln(penetration)/(resistance)) of the fine fiber layer and the substrate material is 500 (cm/sec)/(cm/Hg) to 2000 (cm/sec)/(cm/Hg) at 0.3 μm and 10.5 ft/min (5.3 cm/sec).

18. The method of claim 17, wherein an electrostatic potential is in a range of 60 kV to 120 kV.

* * * * *